March 3, 1964  C. F. KEWAY, SR  3,123,110
SAW CHAIN FOR POWER DRIVEN CHAIN SAWS
Filed Oct. 27, 1960
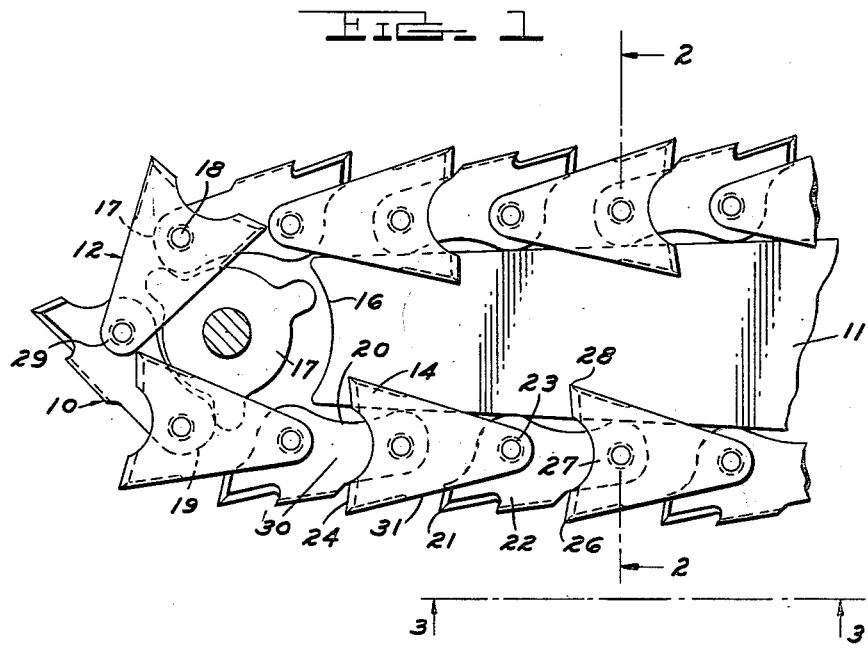
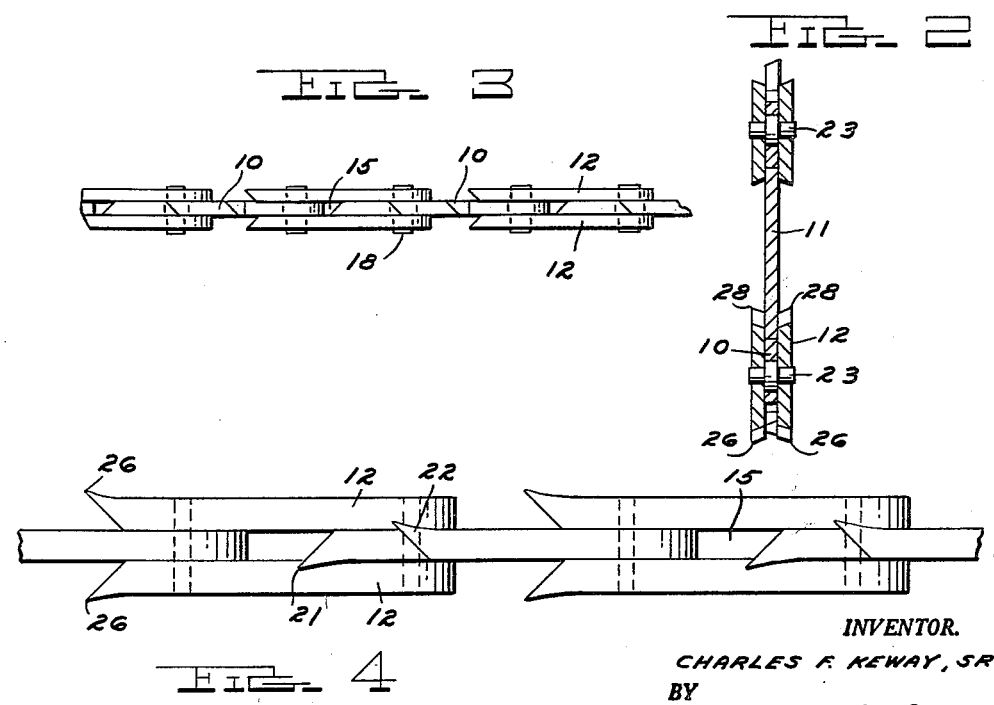
INVENTOR.
CHARLES F. KEWAY, SR.
BY
William P. Ewald
ATTORNEY

United States Patent Office 3,123,110
Patented Mar. 3, 1964

3,123,110
SAW CHAIN FOR POWER DRIVEN CHAIN SAWS
Charles F. Keway, Sr., Grayling, Mich., assignor to Keway Enterprises, Inc., Grayling, Mich., a corporation of Michigan
Filed Oct. 27, 1960, Ser. No. 65,332
1 Claim. (Cl. 143—135)

This invention relates to an improved saw chain for power driven chain saws.

Saw chains have been employed heretofore to facilitate the rapid cutting of wood, however, the several devices of the prior art have not proven entirely satisfactory inasmuch as they are complicated in design and construction, expensive to manufacture, and not entirely satisfactory in use.

With the foregoing in view, the primary object of the invention is to provide a saw chain which is simple in design and construction, inexpensive to manufacture, easily operated, and more satisfactory in use wherein the saw chain cuts straight, evenly, smoothly, and rapidly.

An object of the invention is to provide a saw chain having alternating single and double links overlapping one another and pivotally interconnected with the double links lying sidewise outside the plane of the single links wherein a track blade receiving channel is formed by a portion of the double links extending upwardly above the back portion of the single links.

An object of the invention is to provide single links in spaced lengthwise relationship relative to one another with the paired double side links covering the space between the single links creating a sprocket gear tooth receiving pocket therebetween in driving relationship with the rear end of the single links and in sidewise guided relationship relative to the double side links.

An object of the invention is to provide a relatively large front end on the double links for providing guide means, tooth area, and chip conveying area and, a relatively small rear end thereon for avoiding interference in turning around a sprocket gear and the reverse curved end of a saw track blade.

An object of the invention is to provide a dished or concaved back surface in the top of the single links so as to avoid interference in turning around a sprocket gear and the reverse curved end of a saw track blade.

An object of the invention is to provide two oppositely disposed teeth on the center link and oppositely disposed teeth on the double side links relative to one another so as to compensate for thrust to insure cutting in a straight line without jerking and with a smooth cutting action.

An object of the invention is to use the relatively large forward end of the paired side links as conveyor elements in the saw cut in the workpiece so as to rapidly convey chips and dust out of the workpiece area as fast as they are cut.

An object of the invention is to provide cutting teeth in the top portion of the double side links in the area of the guide portion co-acting with the saw track blade to insure clean-out cutting of the workpiece along the sides of the cut above the area of the initial cut.

An object of the invention is to provide a saw chain which is usable on any power chain saw.

These and other objects of the invention will become apparent by reference to the following description of a saw chain embodying the invention taken in connection with the accompanying drawing in which:

FIG. 1 is a partial view of the saw chain in side elevation including a sprocket gear and a saw track blade with the saw chain and track blade being broken away.

FIG. 2 is a cross-sectional view of FIG. 1 taken on the line 2—2 thereof.

FIG. 3 is a top-plan view of a portion of the saw chain taken on the line 3—3 of FIG. 1; and FIG. 4 is an enlarged drawing of the saw chain seen in FIG. 3 showing the oppositely inclined and set teeth in more detail.

Referring now to the drawing wherein like numerals refer to like corresponding parts throughout the several views, the saw chain disposed therein to illustrate the invention comprises tooth center links 10 lying in the plane of the track blade 11 pivotally interconnected with double side links 12 lying sidewise outwardly of the plane of the track blade 11 having an upwardly extending top portion 14 in sidewise engagement with the track blade 11 on either side thereof slidably guiding the chain on the track blade 11; the center links 10 are endwise spaced apart creating a pocket 15 for receiving the tooth 16 of a sprocket gear 17 therebetween in driving relationship to the back end 17 of a center link 10 with the double side links 12 enclosing the side portions of the pocket 15 providing guide means relative to the teeth 16 of the sprocket gear 17.

More particularly the center links 10 have front and rear apertures receiving the connecting pins 18, a rounded rear end 19 for smooth co-operation with the sprocket teeth 16, and a relieved or dished top or back portion 20 for by-passing and avoiding interference with the sprocket wheel 17 and the reverse curve end of the track blade 11, not shown, a front tooth 21 and a rear tooth 22 oppositely beveled and set relative to one another so as to cut in opposite directions to effect a clean cut in the workpiece and to compensate for cutting side thrust relative to the workpiece. The dished back forms front and rear lobes for sliding against the track blade. The double side teeth are substantially triangular in shape and have a relatively large front end 21 and a relatively small rear end 22; the front end 21 includes the track blade guide portions 14, an inwardly inclined bottom tooth 26, an inwardly relieved center portion 27 enlarging the space between the side links on either side of the chain for carrying chips and dust from the workpiece. The guide portion 14 is also equipped with an inwardly inclined tooth 28 and since the teeth 26 and 28 on the side links 12 on either side of the chain are both inwardly inclined, the stress incident to cutting through a workpiece are compensated as they cut in opposite directions; the upper tooth 28 on either side of the chain has been found advantageous in use due to the fact that it follows down through initial cut in the workpiece and cleans out the cut made by the tooth 26.

Referring to FIGURE 4, it will be noted that the side link 12 teeth 26 and 28 preferably are set outwardly at their outer ends and that the center link 10 front tooth 21 is set in one direction while the back tooth 22 is set in the opposite direction and it can now be more easily seen that the thrust in cutting through a workpiece is self compensated in the chain due to the fact that the teeth of the double side links are oppositely beveled and set and that the teeth of the center link are oppositely beveled and set.

In operation, the chain is mounted on a power saw track blade 11 and sprocket wheel 17 with the sprocket teeth 16 driving the back end 17 of the center teeth 10 to effect its rotation with the side guide portions 14 on the side links 12 keeping the chain on the track blade 11 and on the sprocket gear teeth 16; the direct thrust cutting is absorbed by the single center links 10 backs 20 lying in the plane of and engaging the track blade 11 in sliding relationship.

In use, with the sprocket wheel 17 driving the chain, the center teeth 21 and 22 cut and remove material from the workpiece in their area and the side teeth 24 on the double side links 12 cut and remove material in their area. The material cut out of the workpiece is thrown into the space 30 between the side links 12 and due to the upwardly inclined bottom 31 on the side links 12 the material is free to rise up as it is cut into the space 30 and travel with the chain ahead of the side links front end 24 till it leaves the workpiece whereupon it is dropped out or ejected due to the velocity of the chain.

It will be noted that the relatively small back end 29 of the double side links 12 provides for chip clearance and also avoids interference in turning around the sprocket wheel 17 and around the reverse curved end of the track blade 11.

The novel saw chain with these features described constitutes a compact, durable, and easily operated mechanism of substantially two manufactured parts due to the fact that the center links are identical and the paired side links are identical to one another and it is to be noted that their construction is such that they can be easily manufactured, maintained, and sharpened.

Although but a single embodiment of the invention has been shown and described in detail, it is obvious that many changes may be made in the size, shape, detail, and arrangement of the various elements of the invention within the scope of the appended claim.

I claim:

Saw chain linkage comprising spaced single center links having front and rear end pin receiving apertures, spaced double side links on either side of said center links spanning the space between said center links and having front and rear end pin receiving apertures aligned with said center link rear and front apertures respectively, connecting pins disposed in said aligned apertures interconnecting said links; said center links having a top side; said side links having a top portion extending above said center links top side; said side links top portions together with said center links top side forming a track blade receiving channel for positioning and holding said chain on a track blade; said links spacing and location creating a pocket endwise between said center links and sidewise between said side links in their center link spanning area for positioning and holding said chain on the teeth of a driving sprocket gear with the rear end of said center link providing a driving boss and said side links providing slide guides, all said links having saw teeth for removing material from a workpiece; both said side links and said center links having a portion projecting forwardly of the other links rear pin receiving aperture; said saw teeth on said links being carried by all said links forwardly projecting portion said side links having a relatively large concave front end, a relatively small convex rear end, and paired top and bottom sides leading from said large front end to said small rear; said side links thereby being lengthwise substantially triangular; said relatively large concave front end constituting means for conveying chips and dust and said relatively small rear end avoiding interference with said teeth of said center link and exposing them sidewise for travel of chips and dust therefrom into the path of said large front end on said next side teeth.

References Cited in the file of this patent

UNITED STATES PATENTS

| 834,251 | Bailey | Oct. 30, 1906 |
| 1,004,245 | Crouch | Sept. 26, 1911 |
| 1,354,439 | McCormick | Sept. 28, 1920 |
| 1,559,522 | Frunk | Oct. 27, 1925 |
| 2,391,286 | Wolf | Dec. 18, 1945 |

FOREIGN PATENTS

| 168,149 | Austria | Apr. 25, 1951 |
| 510,703 | Italy | Jan. 22, 1955 |
| 931,548 | Germany | Aug. 11, 1955 |